Nov. 22, 1932.  C. H. WITTHOFFT  1,888,483
ROLLER BEARING
Filed Feb. 20, 1930
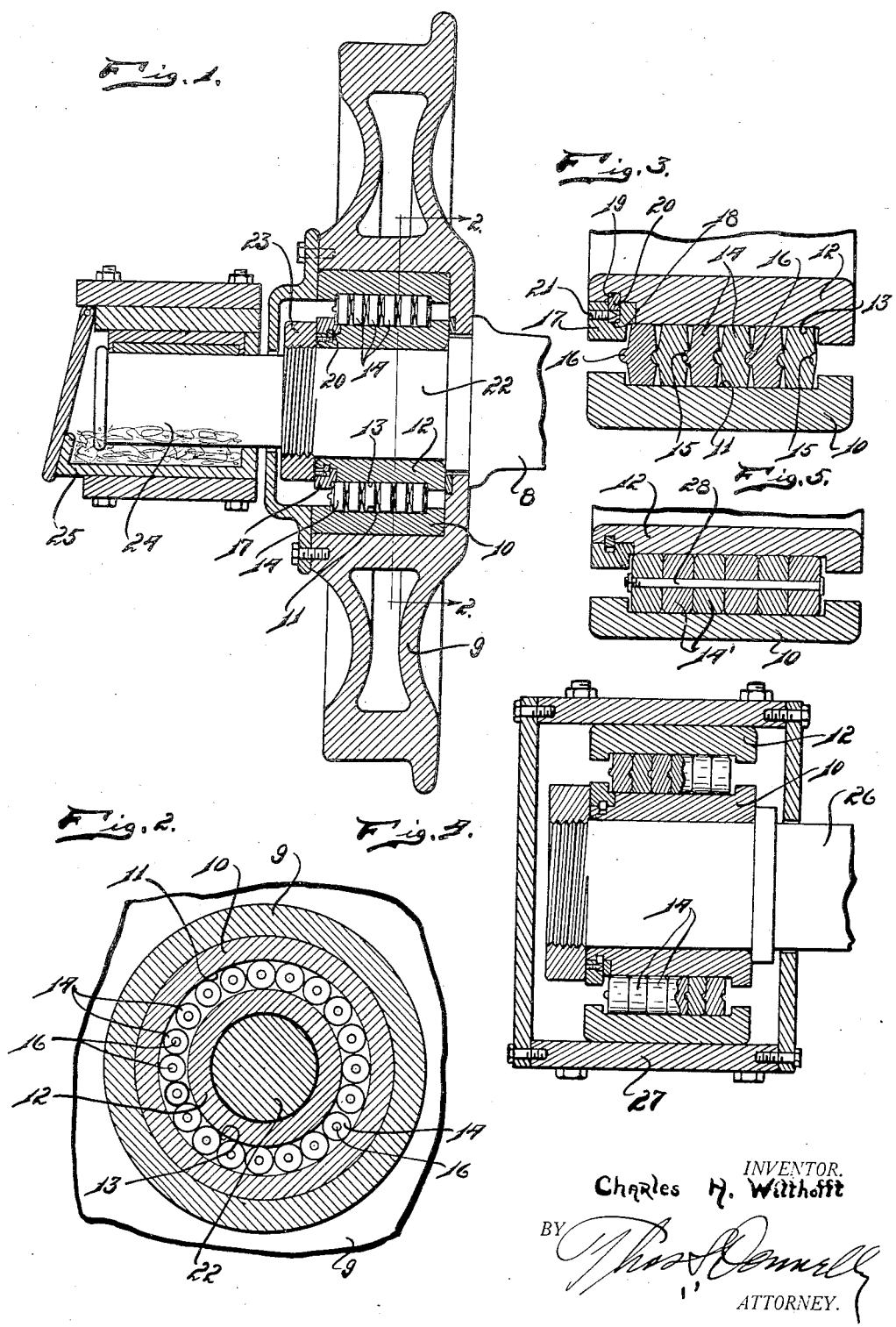
INVENTOR.
Charles H. Witthofft
BY
ATTORNEY.

Patented Nov. 22, 1932                                              1,888,483

UNITED STATES PATENT OFFICE

CHARLES H. WITTHOFFT, OF ST. LOUIS, MISSOURI

ROLLER BEARING

Application filed February 20, 1930. Serial No. 429,887.

My invention relates to a new and useful improvement in a roller bearing and has for its object the provision of a roller bearing provided with a plurality of anti-friction members maintained in alignment and at the same time free for rotative movement.

Another object of the invention is the provision of a roller bearing having a plurality of anti-friction members so arranged and so constructed that relative displacement of these members is reduced to a minimum.

Another object of the invention is the provision of a roller bearing having a plurality of anti-friction members maintained in axial alignment with each other and free for rotative movement.

Another object of the invention is the provision of a roller bearing having a pair of race forming constructed rings so constructed and arranged that a locking ring may be secured on one to retain anti-friction members between these rings.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central sectional view of the invention showing it in use on a locomotive wheel and axle.

Fig. 2 is a view taken on line 2—2 of Fig. 1.

Fig. 3 is an enlarged fragmentary view illustrating the locking means.

Fig. 4 is a central sectional view of the invention showing it applied to a different form of shaft, and Fig. 5 is a fragmentary sectional view showing a modified form of the invention.

In the drawing I have illustrated the invention used with an axle 8 on which is mounted the wheel 9. The bearing comprises the outer ring 10 and the inner ring 12 which are normally in spaced relation. The outer ring 10 is provided with the recess 11 on its inner face and the inner ring 12 is provided with the recess 13 on its outer face to provide a race-way in which engage the rollers or anti-friction members 14 positioned between the rings 10 and 12 which are in concentric relation. On one side of the roller, centrally thereof, is formed a recess 15 for the reception of a boss 16 projecting outwardly from the opposite side of an adjacent roller. A retaining ring 17 is secured on the ring 12 to retain the anti-friction members 14 in position between the rings 10 and 12. A radially extending recess 18 is formed in the retaining ring 17 in which engages a locking ring 20 which also engages in a recess 19 formed in the outer ring 10. In assembly the ring 20 engages in the recess or groove 18 and the ring 17 is positioned as shown in Fig. 3. An inward threading of the screw 21 will then serve to force the locking ring 20 outwardly so as to project it into the recess 19 thus locking the retaining ring in position. The ring 12 is shown positioned on the reduced portion 22 of the axle 8 and a locking ring 23 is threaded on the axle 22. An extension 24 on the reduced portion 22 projects into the stuffing box or lubricant container 25.

In use, the engagement of the boss 16 in the recess 15 will serve to retain the respective rows of roller bearings or anti-friction members in alignment while at the same time these members are free for rotative movement.

In the form shown in Fig. 4 the construction of the bearing is as already described. This bearing being illustrated as mounted on the axle 26 which projects into the bearing housing 27. In the form shown in Fig. 5 the construction is as already described except the recesses 15 and the bosses 16 are eliminated and a bolt 28 is projected through the roller bearings or anti-friction members to retain them in alignment. With a bearing constructed in this manner an easy and quick assembly is provided and there is afforded an anti-friction bearing which may be subjected to great strain. Consequently the bearing may be mounted on locomotives, rolling stock, and etc., and yet be permitted at all times to function most efficiently.

While I have illustrated and described the preferred form of construction I do not wish to limit myself to the precise details of structure shown but desire to avail myself of such variations and modifications as may come within the scope of the appended claims.

Having thus described my invention what I claim as new and desire to secure by Letters Patent is:

1. In a roller bearing of the class described: a plurality of anti-friction bearing members arranged in rows, each of said bearing members having a boss projected outwardly from one side and engaging in a recess formed in the opposite side of an adjacent bearing.

2. In combination, an axle; a reduced extension on said axle, the larger portion of said axle adjacent the end of said extension being peripherally threaded; a bearing on the enlarged portion of said axle rearwardly of said threads and comprising an inner ring embracing said axle; an outer ring embracing said inner ring and spaced therefrom; anti-friction members positioned between and engaging said rings; a locking ring embracing one end of said inner ring; means for locking said locking ring on said inner ring; and a locking ring threaded on said threaded portion of said axle and engaging the outer face of said locking ring and the end face of said inner ring.

In testimony whereof I have signed the foregoing specification.

CHARLES H. WITTHOFFT.